United States Patent [19]
Leffingwell

[11] 4,147,838
[45] Apr. 3, 1979

[54] RECHARGEABLE BATTERY WITH SEPARATE CHARGING TERMINAL

[75] Inventor: Edward A. Leffingwell, Gainesville, Fla.

[73] Assignee: General Electric Company, Worthington, Ohio

[21] Appl. No.: 896,039

[22] Filed: Apr. 13, 1978

[51] Int. Cl.² .................. H01M 10/04; H02J 7/00
[52] U.S. Cl. .................................. 429/1; 429/178; 320/2
[58] Field of Search ............ 429/1, 178, 49, 185, 429/123, 179; 320/2, 4, 28, 29; 339/46

[56] References Cited
U.S. PATENT DOCUMENTS

| | | | |
|---|---|---|---|
| 2,159,034 | 5/1939 | Matthews | 429/1 |
| 3,089,072 | 5/1963 | Jephcott | 429/178 X |
| 3,977,906 | 8/1976 | Beatty et al. | 429/185 |
| 4,006,396 | 2/1977 | Bogut | 320/2 |
| 4,080,557 | 3/1978 | Hennion | 320/2 |

Primary Examiner—Anthony Skapars
Attorney, Agent, or Firm—Morgan, Finnegan, Pine, Foley & Lee

[57] ABSTRACT

A separate charging terminal on a rechargeable battery permits the battery to be recharged in an appliance fitted with a cooperating contact. In this manner only a rechargeable battery may be electrically coupled to the charging circuit of the appliance.

14 Claims, 6 Drawing Figures

RECHARGEABLE BATTERY WITH SEPARATE CHARGING TERMINAL

The present invention relates to the field of rechargeable batteries and more particularly to batteries capable of being recharged in the appliance in which they are utilized.

BACKGROUND OF THE INVENTION

There is an increasing number of consumer products being operated by rechargeable cells, such as nickle-cadmium cells. Rechargeable batteries are manufactured in sizes corresponding to many of the non-rechargeable batteries, e.g. AA, C, D, and 9-volt sizes, with the result that consumers may substitute a rechargeable battery for a non-rechargeable battery and vice versa.

Many consumer appliances are now equipped with internal circuitry and sold with charging transformers so that rechargeable batteries may be charged in place in the appliance. Many of these appliances also accept primary batteries which cannot be recharged and should not be subjected to recharging. As a result the need exists for a method of using both primary and rechargeable batteries interchangeably but without charging the primary batteries.

SUMMARY OF THE INVENTION

The present invention provides a means whereby only rechargeable batteries are connected to the charging circuit of an appliance.

To this end, a rechargeable battery of the present invention includes a charging terminal contact separate from its power terminal but in electrical contact with one of them. In this manner, the power terminals are physically separate from the charging terminals.

The appliance is also constructed such that at least one of its charging terminals is physically separate from its power terminals. Advantageously, the appliance has a common battery line and separate load and charger circuit lines.

DETAILED DESCRIPTION

Figure 2:
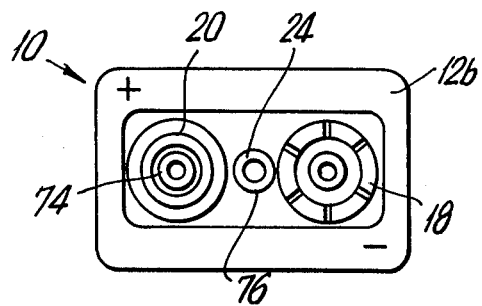
FIG. 2 is a terminal end view of the battery of FIG. 1.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

Figure 1:
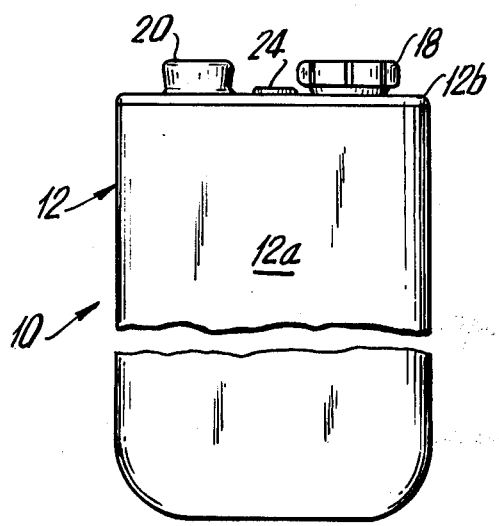
FIG. 1 is a fragmentary elevation view of a 9 volt size battery with a charging terminal in accordance with the present invention.

FIG. 1 illustrates a rechargeable battery 10 in accordance with the present invention. Battery 10 includes a housing 12 formed of a generally rectangular shaped portion 12a, which is open at the top, and a top or end closure plate 12b. Portion 12a and plate 12b are formed of an insulative plastic material, such as polystyrene, and are joined by means of adhesive or ultrasonic welding techniques.

Figure 3:
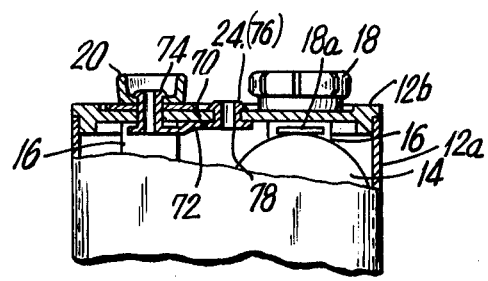
FIG. 3 is a fragmentary cross-sectional view of a battery illustrating a first charging terminal embodiment.

Battery 10 is sized for 9 volt usage in its physical dimensions and includes six rechargeable nickel cadmium cells 14, FIG. 3, having a nominal voltage of 1.25 V.D.C. Cells 14 are connected in series by conductive straps with the first and last cells connected by straps 16 to the battery terminals on the underside of end plate 12b. While the battery is illustrated as a 9 volt size battery, it will be appreciated that the present invention is not limited solely to such size.

Figure 6:
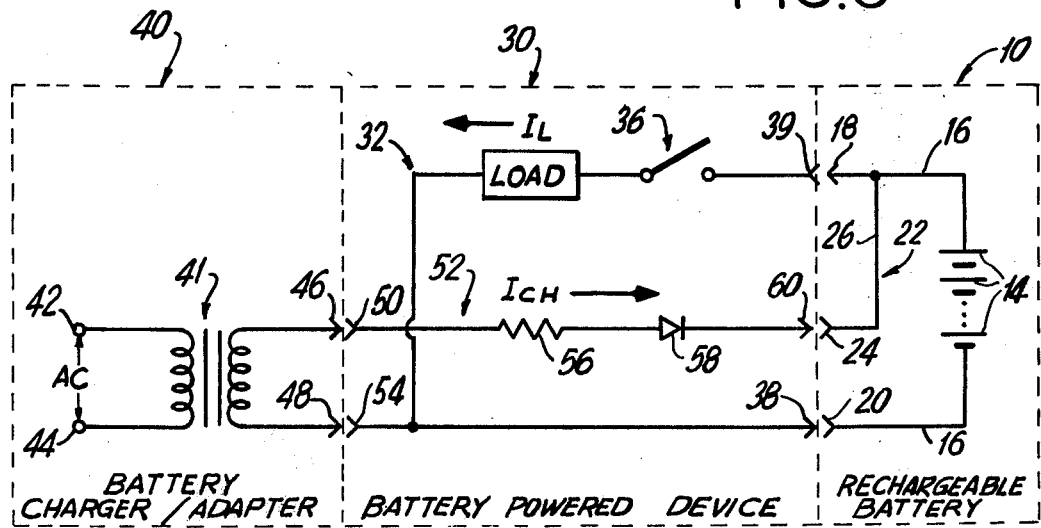
FIG. 6 is a circuit diagram of a battery charger, battery powered device, and rechargeable battery.

The first cell is connected to a female, one-way, snap power terminal 18 affixed to plate 12b by rivet 18a and the last cell of the series is connected to a male, one-way, snap power terminal 20 to complete the normal electrical circuit of the battery as shown in FIG. 6.

With particular reference to FIG. 6, the present invention involves the provision of a separate charging branch 22 in the battery. Branch 22 includes a terminal contact 24 and lead 26 and is tapped into electrical contact with the positive strap 16 to provide independent charging when the battery 10 is installed in an electrical device 30.

Device 30 is shown schematically in FIG. 6 and includes a load line 32 having a load 34 and series switch 36 in parallel with battery 10 through power terminal contacts 38 and 39. Terminals 38 and 39 are male and female snap terminals, respectively, and mate with battery terminals 18 and 20, respectively.

Device 30 may include a charging source 40 either as an integral element or as a detachable element. Source 40, as illustrated, is a separate detachable element comprised of a conventional high impedance transformer 41. Two blade contacts 42 and 44 are provided for connection to a line source of 120 V.A.C. An output current of appropriate magnitude is provided from the secondary of transformer 41 from end terminals 46 and 48.

Terminal 46 is connected to a terminal 50 in a charging circuit line 52 and terminal 48 is connected to terminal 54 which branches to the battery and load lines. The charging circuit may be of any conventional type. A half-wave rectifier circuit is illustrated which includes a series combination of a resistor 56 and diode 58. The charging circuit line terminates with a charging terminal contact 60 which contacts the charging terminal 24 of battery 10.

FIG. 6 illustrates the circuitry in a charging mode wherein switch 36 is open and charging current is supplied from transformer 41 to rechargeable battery 10. After charging is completed, transformer 41 is disconnected from the 120 V.A.C. and may be physically separated from device 30 at the terminal connections 46, 48, 50, 54. The device is then ready for use when switch 36 is closed. Alternatively, device 30 may be operated during recharging.

Terminals 38 and 39 of the device are standard terminals, e.g. 9 volt battery snap type, and may thus be concerned with a primary (non-rechargeable) battery. However, because only batteries of the present invention have a charging branch 26 and terminal 24, which contact the charging line, there is no danger from accidental attempts to charge non-rechargeable batteries since these batteries will not contact terminal 60.

The battery charging branch 22 may be provided in a number of ways, three of which are illustrated in the drawings. A first method is shown in FIGS. 2 and 3, wherein a branch element 70 includes a plate-like portion 72 having an eyelet 74 and 76 at each end. The shank of eyelet 74 fastens the lead strap 16 to terminal 20 and riveted over to affix the terminal to end plate 12b and provide electrical contact therewith. The shank of eyelet 76 protrudes through a hole 78 between terminals 20 and 18 and is riveted over to provide contact terminal 24 for charging.

It will be appreciated that device 30 has a pair of mating terminals 38 and 39 which may be positioned on a mounting board for interconnecting with battery terminals 18 and 20. A centrally located terminal pin 60 is carried by the board for contact with terminal 24.

Figure 4:
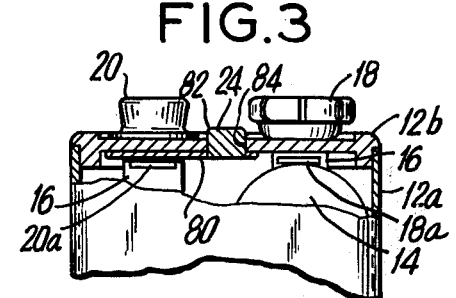
FIG. 4 is a fragmentary cross-sectional view of a battery illustrating a second charging terminal embodiment.

Another charging branch embodiment is illustrated in FIG. 4 wherein a branch element 80 is captivated on the inside of the battery end plate 12b between the rivet head 20a which fastens terminal 20 to the lead strap 16. The free end of element 80 has a boss 82 which protrudes through a hole 84 in end plate 12b to provide a center contact 24 for the battery.

Figure 5:
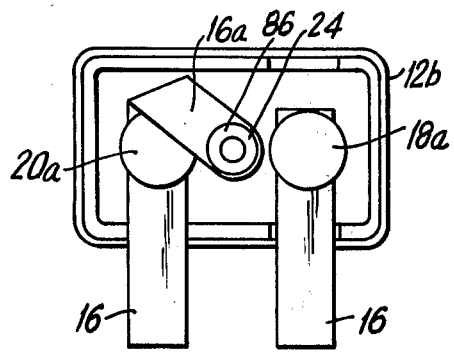
FIG. 5 is a plan view of the interior end plate of a battery illustrating a third charging terminal embodiment.

Still another means of providing a charging branch is shown in FIG. 5. In this embodiment, one of the cell pack end straps 16 extends beyond its associated terminal 20 and rivet 20a. The extended portion 16a of the strap is folded back and fastened to the center of the end plate by an eyelet rivet 86 to provide the charging terminal 24.

These and other modifications may be made to the present invention without departing from the scope and spirit thereof as pointed out in the appended claims.

What is claimed is:

1. In a rechargeable battery having first and second power terminal contacts wherein the improvement comprises a charging terminal contact spaced from said power terminal contacts and in electrical contact with one of said power terminal contacts, whereby said charging terminal and the other of said power terminals form the charging circuit terminals for the battery.

2. The battery of claim 1, wherein said power terminal contacts are one-way contacts.

3. The battery of claim 2, wherein said one-way contacts are snap-fit contacts.

4. The battery of claim 1, wherein said terminal contact is equidistant between said power contacts.

5. The battery of claim 1, wherein said battery is a 9-volt size battery.

6. The battery of claim 1, wherein said battery is nickel cadmium.

7. In a rechargeable battery having a housing containing a plurality of rechargeable cells connected in series, the first and last of said series cells being connected to power terminal contacts affixed to said housing, wherein the improvement comprises a charging terminal contact extending from said housing between said power terminals, said charging contact being in electrical contact with one of said power terminal contacts.

8. The battery of claim 7, wherein said battery has nickel cadmium cells.

9. The battery of claim 7, wherein said battery is 9 volt size.

10. The battery of claim 7, wherein said charging terminal is provided by a branch element having an eyelet at each end, one of said eyelets being riveted to one of said power terminals to provide said electrical contact and the other being riveted to said housing.

11. The battery of claim 7, wherein said charging terminal includes a boss element extending through said housing.

12. The battery of claim 7, wherein said charging terminal includes a conductive strap extending from one of said power terminals on the interior of said housing and affixed thereto by a rivet extending through the housing.

13. An electrical system for use with a rechargeable battery or non-rechargeable battery comprising:
a load circuit having a pair of power terminals adapted to electricaly couple to a battery to receive power therefrom whereby rechargeable or non-rechargeable batteries may be coupled thereto;
and a charger circuit for charging a rechargeable battery, said charger circuit being electrically coupled to one of said power terminals and having a separate second terminal contact independent of said power terminal contacts, whereby only rechargeable batteries having a separate charging terminal contact to couple with said second terminal contact may be electrically coupled to the charger circuit.

14. The system of claim 13 wherein said power terminals are one-way snap-fit type terminals.

* * * * *